(12) United States Patent
Sundberg et al.

(10) Patent No.: US 10,716,040 B2
(45) Date of Patent: Jul. 14, 2020

(54) WIRELESS DEVICE AND METHOD FOR TRIGGERING CELL RESELECTION

(71) Applicant: Telefonaktiebolaget LM Ericsson (publ), Stockholm (SE)

(72) Inventors: Mårten Sundberg, Årsta (SE); John Walter Diachina, Garner, NC (US); Olof Liberg, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/748,690

(22) PCT Filed: Jun. 9, 2016

(86) PCT No.: PCT/SE2016/050561
§ 371 (c)(1),
(2) Date: Jan. 30, 2018

(87) PCT Pub. No.: WO2017/044025
PCT Pub. Date: Mar. 16, 2017

(65) Prior Publication Data
US 2019/0007872 A1  Jan. 3, 2019

Related U.S. Application Data

(60) Provisional application No. 62/217,087, filed on Sep. 11, 2015.

(51) Int. Cl.
*H04W 36/00* (2009.01)
*H04W 36/08* (2009.01)
(Continued)

(52) U.S. Cl.
CPC .... *H04W 36/00837* (2018.08); *H04B 17/104* (2015.01); *H04B 17/318* (2015.01);
(Continued)

(58) Field of Classification Search
CPC ........... H04W 36/08; H04W 36/00837; H04W 36/30; H04W 52/0238; H04W 52/0245;
(Continued)

(56) References Cited

U.S. PATENT DOCUMENTS

2002/0042273 A1\* 4/2002 Sasaki .................. H04W 36/18
455/442
2004/0176090 A1   9/2004 Mudigonda et al.
(Continued)

FOREIGN PATENT DOCUMENTS

CN    103298045 A    9/2013
EP    2117141 A1    11/2009
(Continued)

OTHER PUBLICATIONS

3GPP, "3GPP TR 43.869 V1.1.0 (May 2015)", 3rd Generation Partnership Project; Technical Specification Group GSM/EDGE; Radio Access Network; GERAN Study on Power Saving for MTC Devices (Release 13), May 2015, 1-35.
(Continued)

*Primary Examiner* — Steven H Nguyen
(74) *Attorney, Agent, or Firm* — Murphy, Bilak & Homiller, PLLC

(57) ABSTRACT

A wireless device 230 and a method therein for triggering a cell reselection procedure. The wireless device is served by a first Radio Network Node (RNN) 210, and the wireless device and the first RNN are operating in a wireless communications system 200. The wireless device determines a difference between a second signal parameter of a second signal and a first signal parameter of a first signal, wherein the first and second signal parameters are received from the first RNN. Further, the wireless device triggers a cell rese-
(Continued)

lection procedure when the determined difference is larger than a first predetermined threshold value for the cell reselection procedure.

11 Claims, 8 Drawing Sheets

(51) Int. Cl.
  *H04W 52/02* (2009.01)
  *H04B 17/10* (2015.01)
  *H04B 17/318* (2015.01)
  *H04W 36/30* (2009.01)

(52) U.S. Cl.
  CPC ........... *H04W 36/08* (2013.01); *H04W 36/30* (2013.01); *H04W 52/0238* (2013.01); *H04W 52/0245* (2013.01); *Y02D 70/00* (2018.01); *Y02D 70/1224* (2018.01); *Y02D 70/1226* (2018.01); *Y02D 70/1242* (2018.01); *Y02D 70/1262* (2018.01); *Y02D 70/142* (2018.01); *Y02D 70/146* (2018.01); *Y02D 70/21* (2018.01)

(58) Field of Classification Search
  CPC .... H04B 17/104; H04B 17/318; Y02D 70/00; Y02D 70/1224; Y02D 70/1226; Y02D 70/1242; Y02D 70/1262; Y02D 70/142; Y02D 70/146; Y02D 70/21
  See application file for complete search history.

(56) References Cited

U.S. PATENT DOCUMENTS

| | | | | |
|---|---|---|---|---|
| 2008/0004025 A1* | 1/2008 | Lee | .................. | H04W 48/16 455/437 |
| 2009/0280814 A1* | 11/2009 | Farnsworth | ............ | H04B 17/24 455/436 |
| 2012/0014264 A1* | 1/2012 | Wang | .................... | H04W 36/08 370/252 |
| 2014/0099956 A1 | 4/2014 | Wan et al. | | |
| 2017/0070904 A1* | 3/2017 | Mali | .................... | H04W 24/10 |

FOREIGN PATENT DOCUMENTS

| | | |
|---|---|---|
| EP | 2187671 A1 | 5/2010 |
| RU | 2382525 C2 | 2/2010 |
| WO | 2004066666 A1 | 8/2004 |

OTHER PUBLICATIONS

3GPP, "3GPP TS 25.304 V12.6.0 (Jun. 2015)", 3rd Generation Partnership Project; Technical Specification Group Radio Access Network; User Equipment (UE) procedures in idle mode and procedures for cell reselection in connected mode (Release 12); vol. RAN WG2, No. V12.6.0, Jun. 30, 2015, 1-23.

3GPP, "3rd Generation Partnership Project; Technical Specification Group GSM/EDGE Radio Access Network; Radio subsystem link control (Release 12)", 3GPP TS 45.008 V12.4.0 (Nov. 2014), Nov. 2014, 1-153.

* cited by examiner

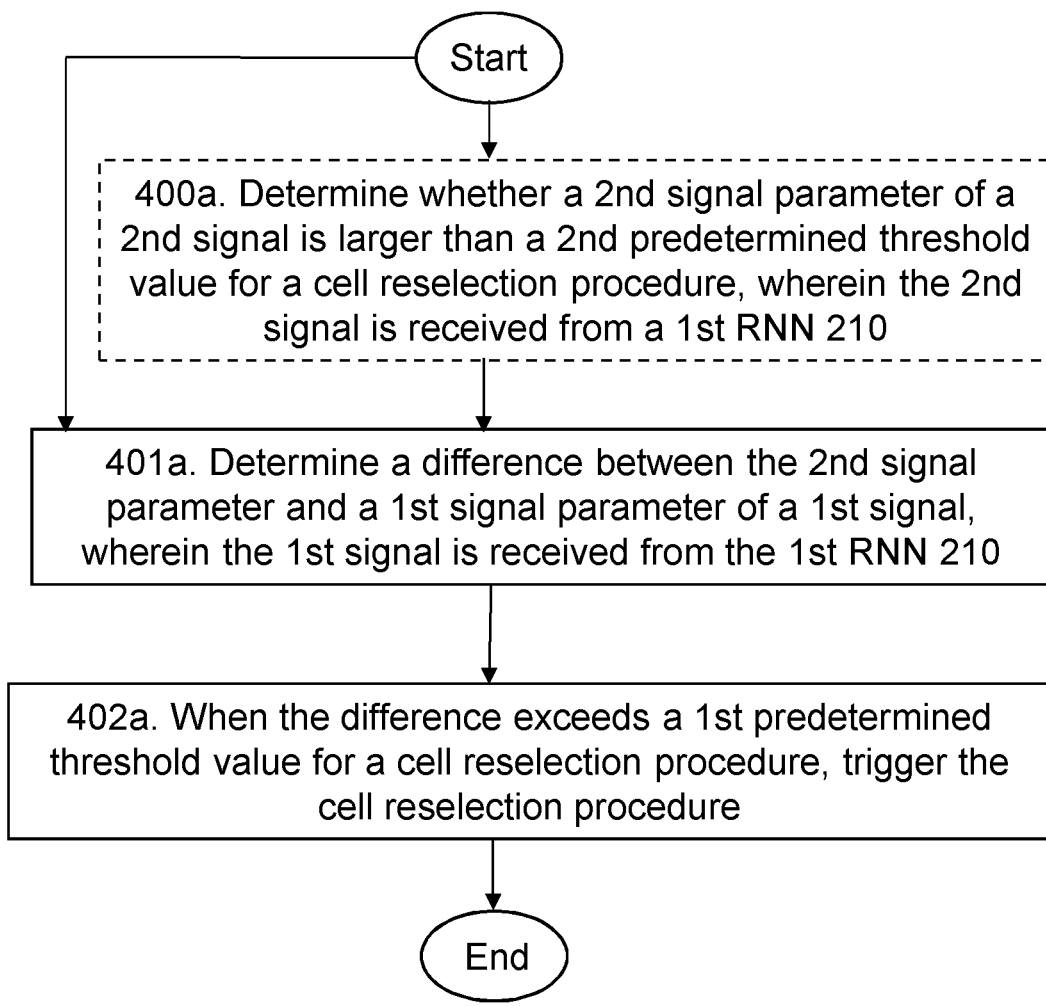
Fig. 4a Method performed by the wireless device 230

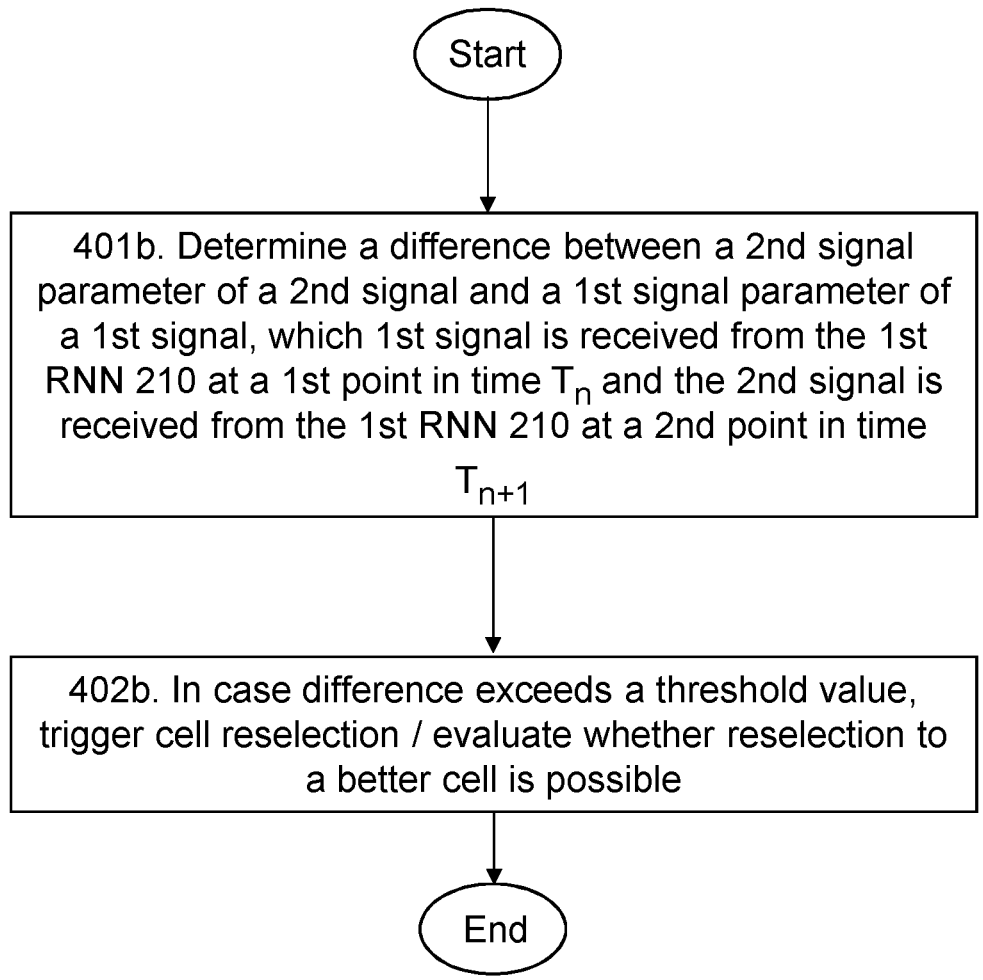
Fig. 4b Method performed by the wireless device 230

WIRELESS DEVICE AND METHOD FOR TRIGGERING CELL RESELECTION

TECHNICAL FIELD

Embodiments herein relate to a wireless device and methods therein. Especially, embodiments herein relate to triggering of a cell reselection procedure.

BACKGROUND

Communication devices such as terminals or wireless devices are also known as e.g. User Equipments (UEs), mobile terminals, wireless terminals and/or mobile stations. Such terminals are enabled to communicate wirelessly in a wireless communication system or a cellular communications network, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

The above terminals or wireless devices may further be referred to as mobile telephones, cellular telephones, laptops, or tablets with wireless capability, just to mention some further examples. The terminals or wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. an "eNB", an "eNodeB", "NodeB", a "B node", or a Base Transceiver Station (BTS), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated at the base station site, may serve one or several cells. Further, each base station may support one or several communication technologies. The base stations communicate over the air interface operating on radio frequencies with the terminals or wireless devices within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

In a wireless communications system, such as a cellular network, a wireless device, e.g. a mobile station, is periodically monitoring the surrounding radio environment, in order for the mobile station to be connected to the most suitable cell, e.g. to the most suitable radio base station serving the cell, or at least to a suitable cell. The selection of the suitable cell may e.g. be based on network decision or by autonomous mobile decision. It should be understood that the expression "the mobile station is connected to a cell" or similar is to be interpreted as the mobile station is connected to a radio network node, e.g. a radio base station or a similar device, that serves or provides radio coverage in a geographical area referred to as the cell. Further, it should be understood that sometimes herein reference is made to the cell and the radio network node serving the cell interchangeably. Thus, sometimes when a reference is made to the cell it should be interpreted as a reference to the radio network node serving the cell.

The initial process to select a cell by searching possible different alternatives is usually referred to as cell selection. The process of periodically monitoring cells and, after an initial cell selection, deciding to move to another cell based on the information acquired through monitoring is usually referred to as a cell reselection procedure.

For cell reselection the process typically involves monitoring different signal strengths from different cells, e.g. from different radio base stations, and ordering them in descending order. That is, the stronger the signal strength from the cell is, the more suitable is the cell to camp on. In case all cells being monitored are weak in signal strength there is typically a minimum allowed signal strength for a cell to be considered as a suitable cell by the mobile station.

By frequently monitoring the surrounding radio environment the mobile station may be ensured to be camping on the cell serving the mobile station with the strongest signal strength, or at least one of the stronger cells, given its current position. In case the mobile station is moving around, the radio environment will change. Hence, to be fully up to date on the surrounding radio environment, the mobile station would have to frequently search for and monitor neighboring cells and to monitor the serving cell, in order to understand the changes over time. This procedure consumes energy, and it will more quickly drain the battery, the more frequently these search procedures are performed. That is a drawback for a mobile station that is dependent on a battery for power.

Although there are mobile stations that benefit from frequent cell-reselection procedures, there are other classes of mobile stations that rather trade a longer battery lifetime for a sub-optimum cell re-selection procedure. At the same time, it is always of interest for any mobile station to be connected to the best cell, e.g. to the cell having the highest signal strength, or at least to a good cell, e.g. to a cell having a high signal strength, to minimize interference levels in the communications network, and hence minimize transmission and/or reception times.

A possible change to the cell re-selection behavior is to allow the mobile station to stay camped on a specific cell as long as the minimum allowed signal strength is fulfilled. In other words, as long as the minimum signal strength is fulfilled, the mobile station would not search for other cells to camp on. However, this would imply that a significant degradation of signal strength of the camped cell would be allowed while still not triggering cell re-selection. If this occurs and better cells are available in the mobile station's current location this would imply increased interference levels in the communications network. Further, it would imply draining of battery during activity by the mobile station since a reduced experienced Signal-to-Interference-plus-Noise Ratio (SINR) would imply a longer ON time for the mobile station both for transmission and reception.

This is illustrated in FIG. 1 wherein it is shown that a mobile station MS has detected, by searching all possible cells, a first cell Cell A, served by a first Radio Network Node (RNN) RNN_A, to be the most suitable cell to camp on when the mobile station MS is located in a first position P1. As the mobile station MS moves to a second position P2, it confirms that cell A still fulfils the criterion on minimum signal strength and hence continues to camp on it.

If the mobile station MS would trigger a cell re-selection, e.g. by searching all possible cells, at any point beyond a point X1 as it moves towards position P2, it would identify a second cell Cell B, served by a second RNN RNN_B, as being the most suitable cell to camp on. This is since the second cell Cell B has a stronger signal strength than the first cell Cell A from the point X1 all the way to the second position P2. However, according to the above described behavior to allow the mobile station to stay camped on a specific cell as long as the minimum allowed signal strength is fulfilled, it is only when the mobile station MS reaches the point X2 it will be triggered to perform a cell re-selection. Thus, it is only at the point X2 the mobile station MS will select the second cell Cell B to be its serving cell, e.g. it is only at the point X2 the mobile station MS will be camping on the second cell Cell B. A drawback is that the mobile station MS continues to camp on the serving cell even if a better cell is available and even if a cell reselection to the better cell would provide better performance.

SUMMARY

Therefore, an object of embodiments herein is to overcome the above-mentioned drawbacks among others and to improve the performance in a wireless communications system. For example, an object of embodiments herein is to overcome drawbacks of degraded SINR and increased interference in a wireless communications system to prioritize mobile station power savings.

According to a first aspect of embodiments herein, the object is achieved by a method performed by a wireless device for triggering a cell reselection procedure. The wireless device is served by a first Radio Network Node (RNN). Further, the wireless device and the first RNN are operating in a wireless communications network.

The wireless device determines a difference between a second signal parameter of a second signal and a first signal parameter of a first signal, wherein the first and second signal parameters are received from the first RNN.

Further, the wireless device triggers a cell reselection procedure when the determined difference is larger, i.e. greater, than a first predetermined threshold value.

According to a second aspect of embodiments herein, the object is achieved by a wireless device for triggering a cell reselection procedure. The wireless device is served by a first Radio Network Node (RNN). Further, the wireless device and the first RNN are configured to operate in a wireless communications network.

The wireless device is configured to determine a difference between a second signal parameter of a second signal and a first signal parameter of a first signal, wherein the first and second signal parameters are received from the first RNN.

Further, the wireless device is configured to trigger a cell reselection procedure when the determined difference is larger, i.e. greater, than a first predetermined threshold value.

According to a third aspect of embodiments herein, the object is achieved by a computer program, comprising instructions which, when executed on at least one processor, causes the at least one processor to carry out the method performed by the wireless device.

According to a fourth aspect of embodiments herein, the object is achieved by a carrier comprising the computer program, wherein the carrier is one of an electronic signal, an optical signal, a radio signal or a computer readable storage medium.

Since the wireless device determines a difference between the second signal parameter of the second signal and the first signal parameter of the first signal, which first and second signal parameters are received from the first RNN and since the wireless device triggers a cell reselection procedure when the determined difference is larger than the first predetermined threshold value, the wireless device may perform cell reselection to a better neighbouring cell, e.g. another cell served by the first RNN or to a neighbouring cell served by a neighbouring RNN, e.g. a second RNN, in a resource efficient way. Thereby, the energy consumption in the wireless device and/or the interference in the wireless communications system is reduced. This results in an improved performance in the wireless communications system.

An advantage with embodiments herein is that a reduced energy consumption is provided when the receiver and transmitter ON time is reduced, e.g. when the ON time for the wireless device and the first RNN is reduced. The ON time is reduced by reducing the triggering of the cell reselection procedure to occasions when the difference between the second signal parameter and the first signal parameter is larger than the first predetermined threshold value. Further, when connected to a cell, the ON time is reduced since the wireless device would be connected to a better cell, meaning experiencing a higher Signal-to-Interference-plus-Noise Ratio (SINR), which would reduce the overall transmission and reception time. In the interest of battery conservation, a wireless device that is battery operated may search for and monitor neighbor cells on a limited basis as long as the current serving cell remains suitable.

The points in time where such a wireless device chooses to re-evaluate the suitability of its current serving cell may also serve as opportunities to determine if that serving cell is deteriorating to an excessive degree. If such a determination is made then the wireless device may begin searching for and monitoring neighbor cells and then perform cell reselection if a better cell is found.

Therefore, some embodiments herein identify a new reselection trigger condition that may help to reduce interference levels in the wireless network by lowering the wireless device's transmit time and to conserve the wireless device's battery by reducing the amount of energy consumed per transmission and/or reception event by reducing the wireless communications device's on time. By the expression "transmit time" when used in this disclosure is meant a period of time during which the wireless device transmits information. Further, by the expression "ON time" when used in this disclosure is meant a period of time during which the wireless device receives and/or transmits information. The ON time may sometimes be referred to as an active time. The additional energy consumed by the wireless device performing the additional processing required to evaluate serving cell deterioration is seen as being substantially less than the energy saved by reducing wireless device transmit "ON time".

BRIEF DESCRIPTION OF DRAWINGS

Examples of embodiments herein will be described in more detail with reference to attached drawings in which:

FIG. 4a is a flowchart depicting embodiments of a method performed by a wireless device;

FIG. 4b is a flowchart depicting embodiments of a method performed by a wireless device;

DETAILED DESCRIPTION

Embodiments herein relate to the cell reselection procedure, e.g. to the triggering of the cell reselection procedure.

Some embodiments herein allow a relaxed idle mode behavior, e.g. a relaxed monitoring of neighbor cells, to provide an improved battery life time in a controlled manner by introducing a new criterion for evaluating the suitability of a serving cell. The new criterion is based on the change in a signal parameter, such as signal strength, path loss, or another metric related to the quality of the serving cell, experienced between two or more consecutive evaluations of the serving cell.

Some embodiments herein define a relative change in a measured signal parameter, e.g. a measured signal strength, of the camped cell, e.g. the served cell. In other words, some embodiments provide a relative change in the measured signal parameter, e.g. the measured signal strength of signals transmitted from a serving radio network node to a wireless device operating in the cell served by the radio network node. The wireless device may determine the relative change in measured signal parameter based on one or more earlier measurements compared to the current measurement and it may trigger a cell re-selection, e.g. a cell re-selection procedure, based on the relative change in the signal parameter.

The wireless device's triggering of the cell re-selection may be based on either unfiltered or filtered values of measured and/or determined signal parameter value, e.g. signal strength, interfering signal strength or path loss. What is referred to as 'signal strength' may be based on the total received signal strength over a specific channel, an estimation of the wanted cell's signal strength, i.e. by identifying the wanted signal strength from the total signal strength, or based on a quality based measure, e.g. based on channel estimation, soft bit quality, detected coverage class or similar metric.

Figure 2:
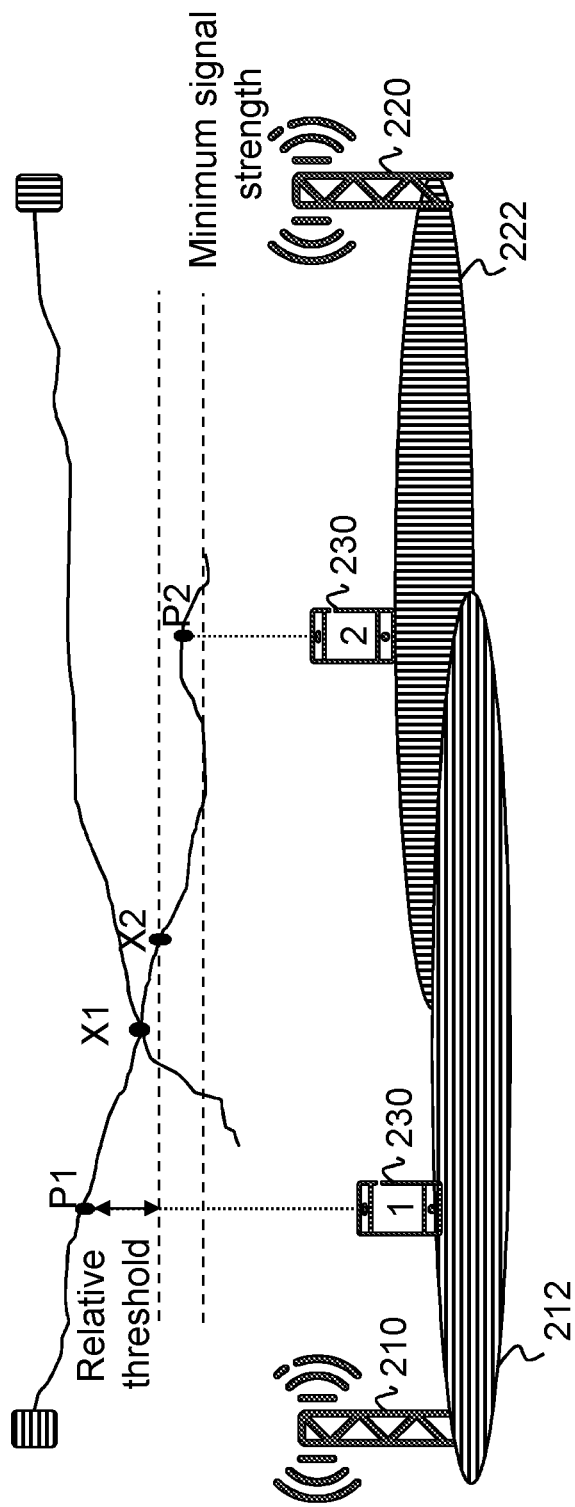
FIG. 2 schematically illustrates cell reselection in embodiments of a wireless communications system.

FIG. 2 schematically illustrates an exemplifying embodiment of a wireless communications system 200. The wireless communications system 200 will be described in more detail below with reference to FIG. 3.

A first Radio Network Node (RNN) 210 serving a first geographical area, e.g. a first cell 212 such as a first serving cell, and a second RNN 220 serving a second geographical area, e.g. a second cell 222 such as a second serving cell, are operating in the wireless communications system 200. It should be understood that more than two RNNs may be operating in the wireless communications system 200 and that one RNN may be configured to serve several geographical areas, e.g. cells. In other words, the first RNN 210 may be configured to serve one or more first cells 212 and the second RNN 220 may be configured to serve one or more second cells 222.

A wireless device 230 is operating in the wireless communications system 200.

Figure 1:
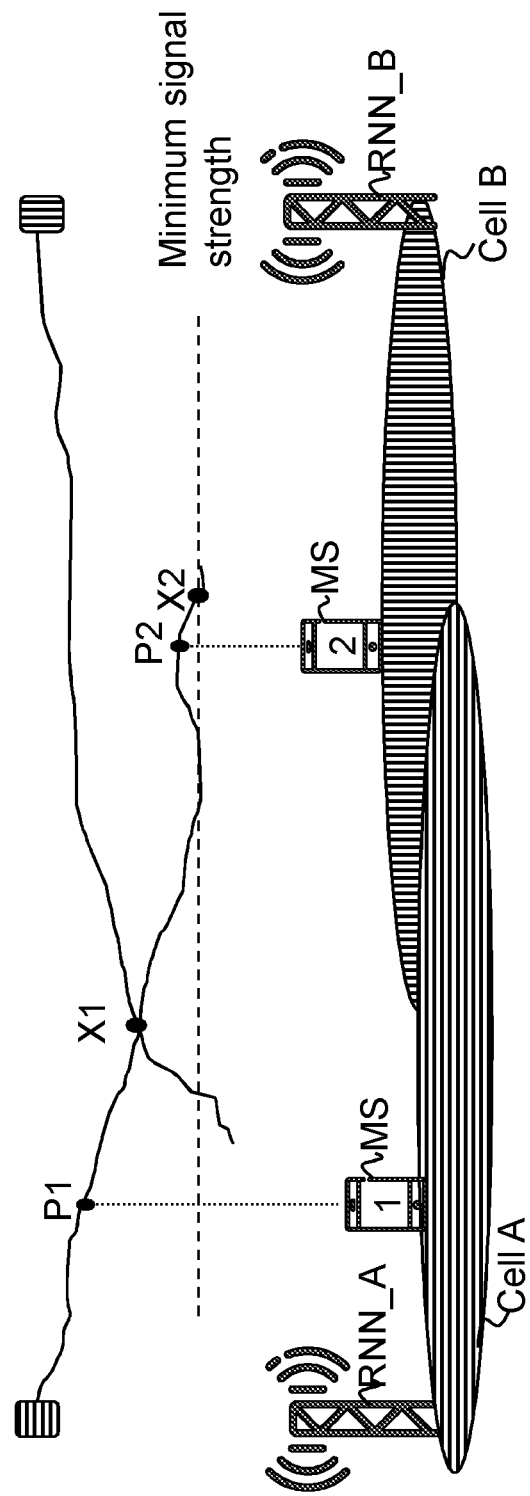
FIG. 1 schematically illustrates cell reselection in a wireless communications system according to prior art.

As schematically illustrated in FIG. 2, a requirement on a relative threshold, e.g. a relative threshold value, may in some embodiments be added whenever the signal parameter measurements, e.g. the signal strength measurements, of the serving cell, e.g. the first cell 212, are performed during the course of the wireless device 230 moving between a first position P1 and a second position P2. Further, since the frequency of performing signal strength measurements allows the wireless device 230 to determine that the signal strength has deteriorated beyond the specified relative threshold by the time the wireless device 230 arrives at the second position P2, the wireless device 230 would at the point of making that determination trigger a cell re-selection procedure to ensure it is camping on the most suitable cell, e.g. on the first cell 212 or on a more suitable cell than the first cell 212. It may be noted that this determination may happen at any position further away than the point X2, and hence the gap, e.g. the interval, between the points X1 and X2 which constitute the distance or time period wherein the wireless device 230 may do a cell re-selection to a better cell but chooses not to has significantly been reduced as compared to the prior art according to FIG. 1.

Terminology

The following terminology is used in embodiments described herein and is elaborated below:

Network node: In some embodiments a more general term "network node" is used and it may correspond to any type of radio network node or any network node, which communicates with a UE and/or with another network node. Examples of network nodes are NodeB, MeNB, SeNB, a network node belonging to a Master Cell Group (MCG) or a Secondary Cell Group (SCG), Base Station (BS), Multi-Standard Radio (MSR) radio node such as MSR BS, eNodeB, network controller, Radio Network Controller (RNC), Base Station Controller (BSC), relay, donor node controlling relay, Base Transceiver Station (BTS), Access Point (AP), transmission points, transmission nodes, Radio Remote Unit (RRU), Remote Radio Head (RRH), nodes in Distributed Antenna System (DAS), core network node (e.g. Mobile Switching Center (MSC), Mobility Management Entity (MME) etc.), Operations and Maintenance (O&M), Operations Support System (OSS), Self-organizing Network (SON), positioning node (e.g. Enhanced Serving Mobile Location Center (E-SMLC)), Mobile Data Terminal (MDT) etc.

User equipment/wireless device: In some embodiments the non-limiting terms wireless device, Mobile Station (MS) and User Equipment (UE) are used and they refer to any type of wireless device communicating with a network node and/or with another UE in a cellular or mobile communication system. Examples of UE/wireless device are Device-to-Device (D2D) UE, machine type UE or UE capable of machine to machine (M2M) communication, Personal Digital Assistant (PDA), Tablet, mobile terminals, smart phone, Laptop Embedded Equipped (LEE), Laptop Mounted Equipment (LME), Universal Serial Bus (USB) dongles etc. In this disclosure the terms wireless device and UE are used interchangeably.

General

Note that although terminology from Global System for Mobile Communications (GSM)/GSM EDGE Radio Access Network (GERAN) has been used in this disclosure to exemplify embodiments, this should not be seen as limiting the scope of embodiments herein to only the aforementioned system. Other wireless systems, including Wideband Code Division Multiple Access (WCDMA), High Speed Packet Access (HSPA), Worldwide Interoperability for Microwave Access (WiMax), WiFi, Wireless Local Area Network (WLAN), and 3GPP LTE, may also benefit from exploiting the ideas covered within this disclosure.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel.

Further, the description frequently refers to wireless transmissions in the downlink, but embodiments herein are equally applicable in the uplink.

In the following section, embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

Figure 3:
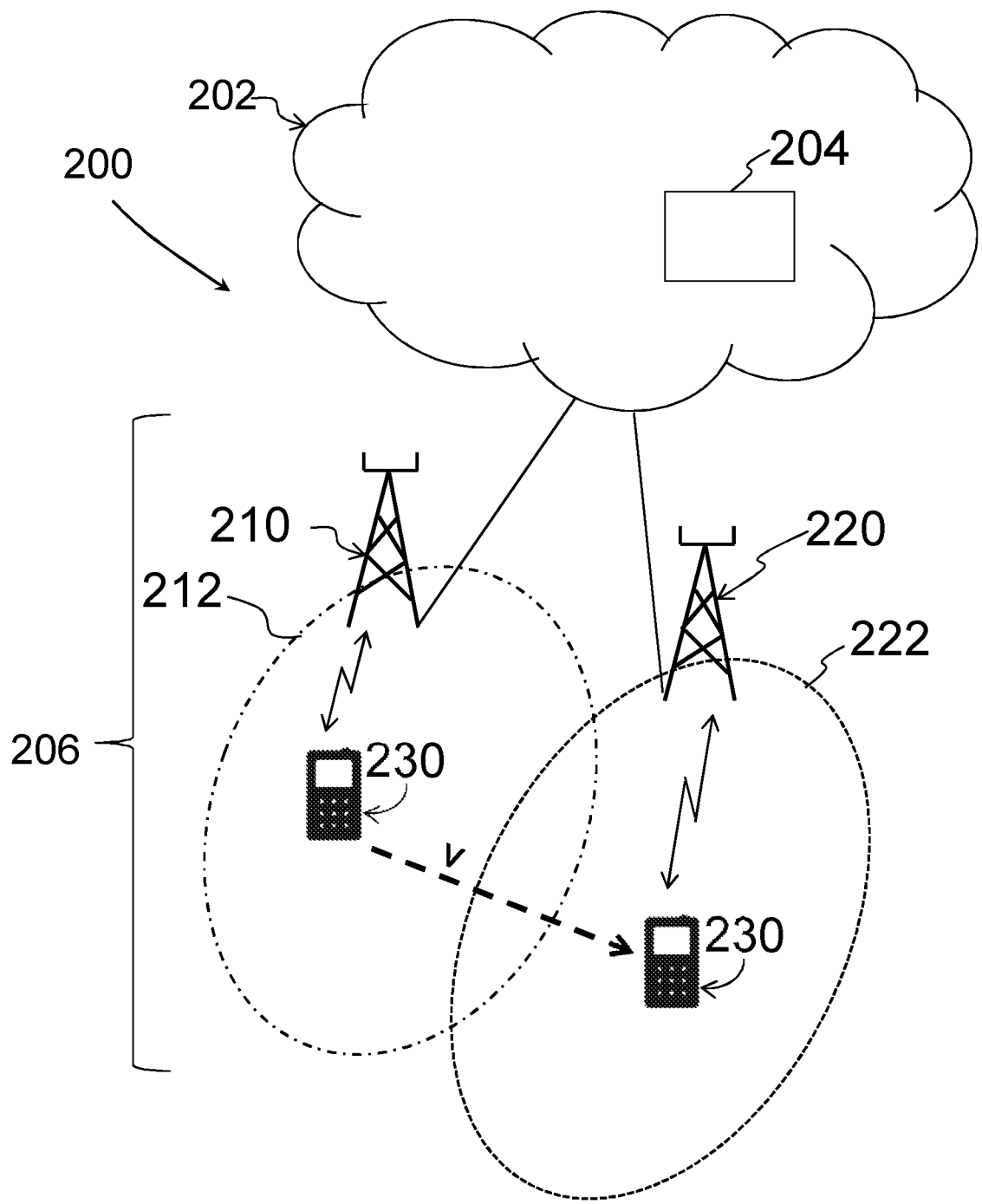
FIG. 3 schematically illustrates embodiments of a wireless communications system.

FIG. 3 depicts an example of the wireless communications system 200 in which embodiments herein may be implemented. The wireless communications system 200 is a wireless communication system such as an LTE system, a WCDMA system, a GSM system, any 3GPP cellular system, WiMAX system, or any wireless or cellular network/system.

A core network 202 is comprised in the wireless communications system 200. The core network 202 is a wireless core network such as an LTE core network, e.g. a Evolved Packet Core (EPC); a WCDMA core network; a GSM core network; any 3GPP core network; WiMAX core network; or any wireless or cellular core network.

A core network node 204 is comprised in the core network 202. The core network node 204 may be a Mobile Switching Center (MSC), a Mobility Management Entity (MME), an Operation & Maintenance (O&M) node, a Serving GateWay (S-GW), a Serving General Packet Radio Service (GPRS) Node (SGSN), etc.

A wireless communications network 206 is comprised in the wireless communications system 200. The wireless communications network 206 is a wireless communications network such as a GERAN network, an LTE communications network, e.g. an Evolved UMTS Terrestrial Radio Access network (E-UTRAN); a WCDMA communications network; a GSM communications network; any 3GPP communications network; WiMAX communications network; or any wireless or cellular communications network.

It should be understood that in some embodiments the core network 202 and the wireless communications network 206 are combined into one single network or that the wireless communications network 206 may comprise the core network 202.

As previously mentioned, the first RNN 210 is comprised in and configured to operate in the wireless communications system 200. The second RNN 220 is comprised in and configured to operate in the wireless communications system 200. The first and second RNNs 210, 220 may each be a radio access node such as a radio base station, for example an eNB, an eNodeB, or a Home Node B, an Home eNode B or any other network node capable to serve a user equipment or a machine type communication device in a wireless communications network.

The first and second RNNs 210, 220 may each be configured for wireless communication with one or more wireless devices, such as the wireless device 230, when the wireless device is located within the first and second geographical areas, e.g. the first and second cells 212, 222, served by the respective RNN 210, 220. Herein, this is also specified as the respective first and second RNN 210, 220 manages or is configured to manage communication with one or more wireless devices in the respective geographical area. In this disclosure, the respective geographical area is sometimes referred to as a respective coverage area or cell. Further, when the wireless device is located within the geographical area and served by the RNN serving the geographical area, that geographical area may be referred to as a serving geographical area, e.g. a serving cell. Thus, when the wireless device 230 is located within the first geographical area and is served by the first RNN 210, the first geographical area is sometimes herein referred to as the serving cell.

The wireless device 230 also referred to as a user equipment or UE is located in the wireless communications system 200. The first wireless device 230 may e.g. be a user equipment, a mobile terminal or a wireless terminal, a mobile phone, a computer such as e.g. a laptop, a Personal Digital Assistants (PDAs) or a tablet computer, with wireless capability, or any other radio network units capable to communicate over a radio link in a wireless communications network. It should be noted that the term user equipment used in this document also covers other wireless devices such as Machine to Machine (M2M) devices, even though they are not handled by any user.

A first example of a method performed by the wireless device 230 for triggering a cell reselection procedure will now be described with reference to a flowchart depicted in FIG. 4a. As mentioned above, the wireless device 230 is served by the first RNN 210, and the wireless device 230 and the first RNN 210 are operating in the wireless communications network 200.

The method comprises one or more of the following actions. It should be understood that these actions may be taken in any suitable order and that some actions may be combined.

Action 400a

In some embodiments and in order to determine whether a difference between a second signal parameter of a second signal and a first signal parameter of a first signal as described in Action 401a below is to be determined, the wireless device 230 determines whether or not the second signal parameter of the second signal is larger, i.e. greater, than a second predetermined threshold value for a cell reselection procedure. Determination that the second signal parameter is larger than the second predetermined threshold value may thus trigger the wireless device 230 to determine the difference between the second signal parameter and the first signal parameter as will be described in Action 401a below.

The second signal is received from the first RNN 210. Action 400a is an optional action. A first predetermined threshold value will be described below under for example Action 402a. As mentioned above, actions may be taken in another suitable order and thus, it should be understood that Action 400a may be performed after Action 402a.

The second signal parameter may be the latest received signal parameter from the first RNN 210, e.g. the latest received signal strength parameter or the latest received path loss parameter. Thus, the wireless device 230 may determine whether or not the latest received signal strength parameter or the latest received path loss parameter is larger than the first predetermined value for the cell reselection procedure.

The second predetermined threshold value may be a predetermined or preset value for cell reselection.

Action 401a

In order to determine whether or not a cell-reselection procedure is to be triggered, the wireless device 230 determines a difference between the second signal parameter of the second signal and a first signal parameter of a first signal. The first signal and the second signal are received from the first RNN 210.

In some embodiments, the difference between the second signal parameter and the first signal parameter is determined when the second signal parameter has been determined to be larger than the predetermined threshold value as described above in Action 400a.

Further, the first signal may be received from the first RNN 210 at a first point in time $T_n$ and the second signal is received from the first RNN 210 at a second point in time $T_{n+1}$. The second point in time $T_{n+1}$ is occurring after the first point in time $T_n$.

The first and second signals may be seen as the same kind of signals, e.g. as a BCCH carrier transmitted from the first RNN 210. The first signal parameter may be the best received signal parameter, e.g. the first signal parameter may be the best received signal strength parameter or the best received path loss parameter.

The first and second parameters are of the same type of parameter, e.g. both are signal strength parameters or path loss parameters. However, it should be understood that the first and second signal parameters may be first and second quality based measures such as first and second estimated raw bit error rates from an equalizer (not shown).

The wireless device 230 may further determine whether or not the difference between the second signal parameter and the first signal parameter is larger than the first predetermined threshold value for the cell reselection procedure.

Action 402a

The wireless device 230 triggers the cell reselection procedure when the determined difference is larger, i.e. greater, than a first predetermined threshold value. Thus, in Action 402a, the wireless device 230 may trigger an evaluation of whether reselection to a better cell is possible.

In some embodiments, triggering of the cell reselection procedure further comprises that the wireless device 230 evaluate a cell reselection criterion for the serving cell, e.g. the first cell 212 served by the first RNN 210, and one or more neighbour cells, e.g. another cell served by the first RNN 210 or the second cell 222 served by the second RNN 220, and performs the cell reselection to the neighbour cell when the neighbour cell provides better signal strength than the serving cell.

The cell reselection criterion may be a cell reselection criterion C2.

In some embodiments, wherein the wireless device 230 determines whether or not the second signal parameter of the second signal is larger than the second predetermined threshold value for a cell reselection procedure as mentioned in Action 400a above, the wireless device 230 triggers the cell reselection procedure by further triggering the cell reselection procedure when the second signal parameter is less than the second predetermined threshold value.

A second example of a method performed by the wireless device 230 for triggering cell reselection will now be described with reference to a flowchart depicted in FIG. 4b. As mentioned above, the wireless device 230 is served by the first RNN 210, and the wireless device 230 and the first RNN 210 are operating in the wireless communications network 200.

The methods comprise one or more of the following actions. It should be understood that these actions may be taken in any suitable order and that some actions may be combined.

Action 401b

In order to determine whether or not a cell-reselection procedure is to be triggered, the wireless device 230 determines a difference between a second signal parameter of a second signal and a first signal parameter of a first signal. The first signal is received from the first RNN 210 at a first point in time $T_n$ and the second signal is received from the first RNN 210 at a second point in time $T_{n+1}$.

The first and second signals may be seen as the same kind of signal, e.g. as a BCCH carrier from the serving cell. The same may be applied to the first and second signal parameters which may be signal strength in both cases.

Action 402b

The wireless device 230 triggers a cell reselection when the determined difference is larger than a threshold value. Thus, in Action 402b, the wireless device 230 may trigger an evaluation of whether reselection to a better cell is possible.

Figure 5:
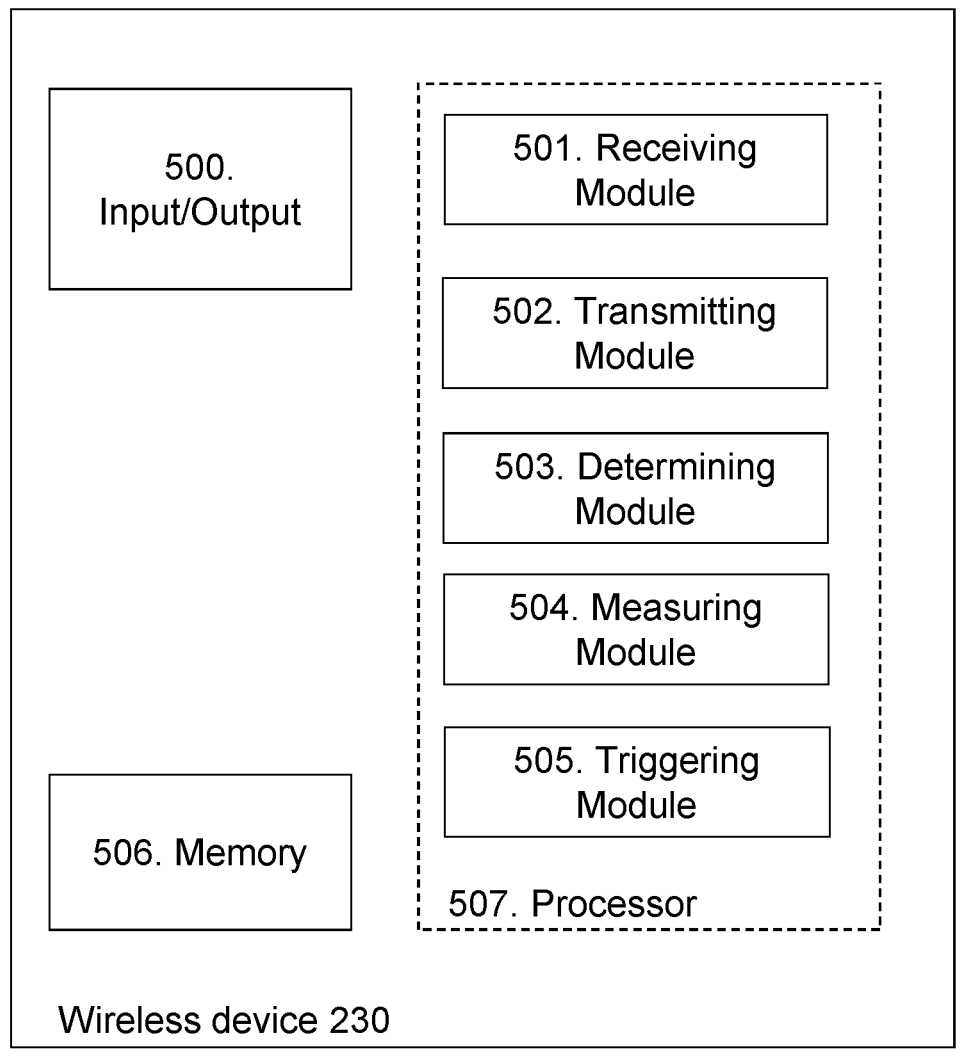
FIG. 5 is a schematic block diagram illustrating embodiments of a wireless device.

To perform the method for triggering cell reselection, the wireless device 230 may be configured according to an arrangement depicted in FIG. 5. As previously described, the wireless device 230 is served by the first RNN 210, and the wireless device 230 and the first RNN 210 are configured to operate in the wireless communications network 200.

In some embodiments, the wireless device 230 comprises an input and/or output interface 500 configured to communicate with one or more wireless devices, one or more radio network nodes, e.g. the RNN 210, 220, and one or more other network nodes, e.g. the core network node 204. The input and/or output interface 500 may comprise a wireless receiver (not shown) and a wireless transmitter (not shown).

The wireless device 230 is configured to receive, by means of a receiving module 501 configured to receive, a signal or information from a RNN, e.g. from the first and second RNN 210, 220. The receiving module 501 may be implemented by or arranged in communication with a processor 507 of the wireless device 230. The processor 507 will be described in more detail below.

The wireless device 230 is configured to receive the first and second signal parameters from the first RNN 210. In some embodiments, the wireless device 230 receives, from the first RNN 210, the first signal parameter at a first point in time $T_n$ and the second signal parameter at a second point in time $T_{n+1}$.

The wireless device 230 may be configured to receive the first and second signals using a BCCH carrier.

As previously mentioned, the first and second signal parameters may be first and second signal strengths, first and second path losses, or first and second quality based measures.

The wireless device 230 is configured to transmit, by means of a transmitting module 502 configured to transmit, a signal or information to the RNN, e.g. the first and second RNN 210,220. The transmitting module 502 may be implemented by or arranged in communication with the processor 507 of the wireless device 230.

The wireless device 230 is configured to determine, by means of a determining module 503 configured to determine, a change in a signal parameter. The determining module 503 may be implemented by or arranged in communication with the processor 507 of the wireless device 230.

For example, the wireless device 230 is configured to determine a difference between the second signal parameter of the second signal and the first signal parameter of the first signal. The first and second signal parameters are received from the first RNN 210.

The wireless device 230 may be configured to determine the difference by being configured to determine whether or not the difference between the second signal parameter and the first signal parameter is larger than the first predetermined threshold value for the cell reselection procedure.

In some embodiments, the wireless device 230 is configured to determine whether or not the second signal parameter is larger than a second predetermined threshold value for the cell reselection procedure.

The wireless device 230 may further be configured to measure, by a measuring module 504 configured to measure, a parameter of a signal, e.g. a signal parameter such as a signal strength or a path loss. The measuring module 504 may be implemented by or arranged in communication with the processor 506 of the wireless device 230.

In some embodiments, the wireless device 230 is configured to trigger, by means of an triggering module 505 configured to trigger, cell reselection, e.g. a cell reselection procedure. For example, the wireless device 230 may be configured to trigger, a cell reselection procedure, i.e. to trigger measurements of serving cell and neighbour cell to determine if cell reselection shall be performed. In some embodiments, the wireless device 230 may be configured to trigger, by means of the triggering module 505 configured to trigger, an evaluation of whether cell reselection to a better cell is possible. The triggering module 505 may be implemented by or arranged in communication with the processor 507 of the wireless device 230.

For example, the wireless device 230 is configured to trigger the cell reselection procedure when the determined difference is larger than the first predetermined threshold value for the cell reselection procedure.

In some embodiments, the triggering of the cell reselection procedure further comprises that the wireless device 230 is configured to evaluate a cell reselection criterion for the serving cell, e.g. the first cell 212 served by the first RNN 210, and one or more neighbour cells, e.g. another cell served by the first RNN 210 or the second cell(s) 222 served by the second RNN 220, and configured to perform the cell reselection to the neighbour cell when the neighbour cell provides better signal strength than the serving cell. If no neighbour cell is found that provides better signal strength than the serving cell, e.g. the first cell 212, the wireless device 230 continues to camp on the serving cell.

In some embodiments, wherein the wireless device 230 is configured to determine whether or not the second signal parameter of the second signal is larger than the second predetermined threshold value for a cell reselection procedure, the wireless device 230 is configured to trigger the cell reselection procedure by further being configured to trigger the cell reselection procedure when the second signal parameter is less than the second predetermined threshold value.

The wireless device 230 may also comprise means for storing data. In some embodiments, the wireless device 230 comprises a memory 506 configured to store the data. The data may be processed or non-processed data and/or information relating thereto. The memory 506 may comprise one or more memory units. Further, the memory 506 may be a computer data storage or a semiconductor memory such as a computer memory, a read-only memory, a volatile memory or a non-volatile memory. The memory is arranged to be used to store obtained information, data, configurations, and applications etc. to perform the methods herein when being executed in the wireless device 230.

Embodiments herein for triggering the cell reselection procedure may be implemented through one or more processors, such as the processor 507 in the arrangement depicted in FIG. 5, together with computer program code for performing the functions and/or method actions of embodiments herein. The program code mentioned above may also be provided as a computer program product, for instance in the form of a data carrier carrying computer program code for performing the embodiments herein when being loaded into the wireless device 230. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the wireless device 230.

Those skilled in the art will also appreciate that the input/output interface 500, the receiving module 501, the transmitting module 502, the determining module 503, the measuring module 504, and the triggering module 505 above may refer to a combination of analogue and digital circuits, and/or one or more processors configured with software and/or firmware, e.g. stored in the memory 506, that when executed by the one or more processors such as the processors in the wireless device 230 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 6:
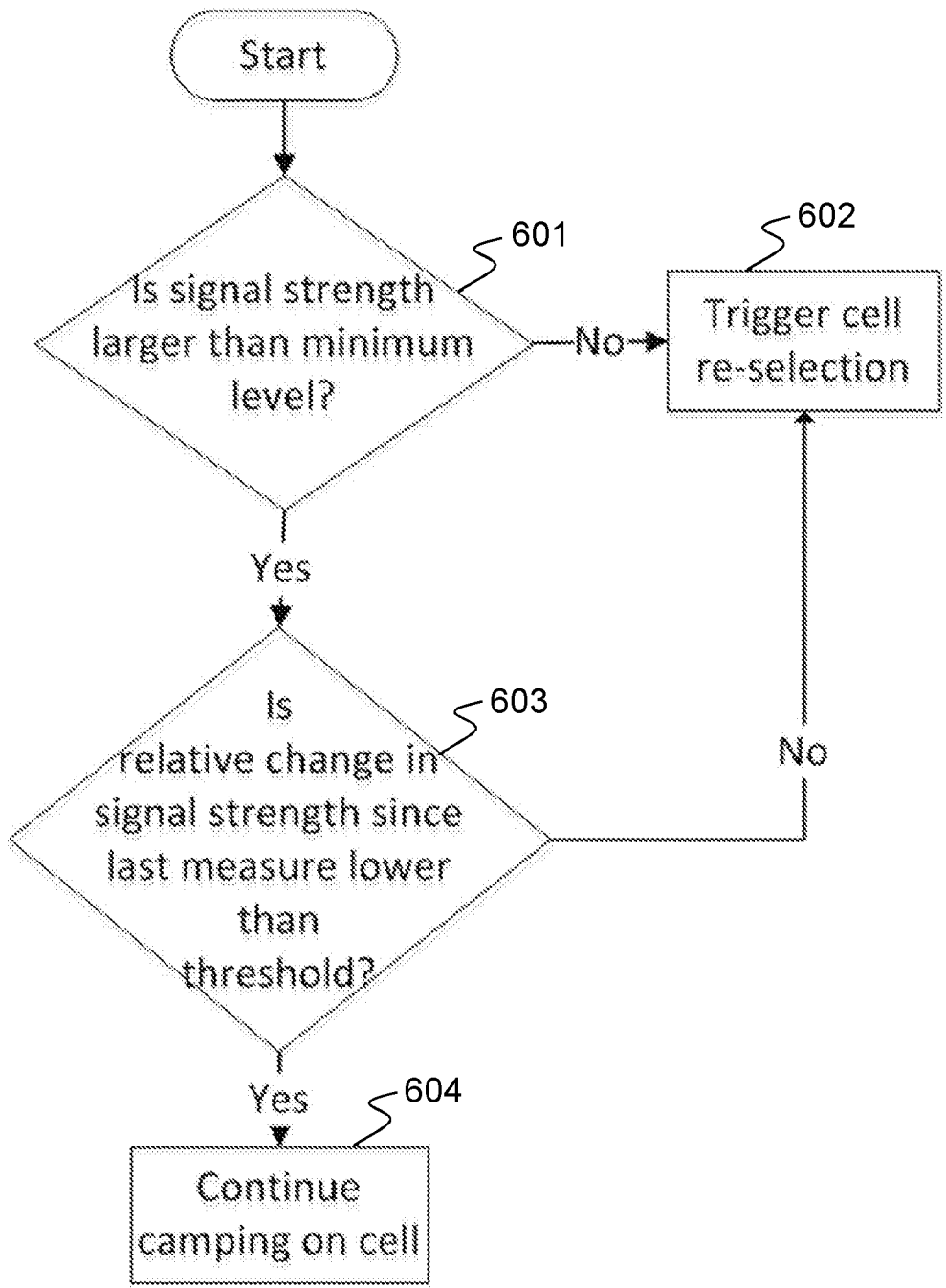
FIG. 6 is a flowchart depicting embodiments of a method performed by a wireless device.

FIG. 6 is a flowchart depicting an example of a method performed by a wireless device 230 according to embodiments herein. In the figure, signal strength is used as an example but is should be understood that another signal parameter, such as path loss, may be used in a corresponding way.

In Action 601 the wireless device 230 determines if the signal strength of a signal received from the serving cell, e.g. the first cell 212, is larger than the second predetermined or pre-set threshold value, e.g. a first predetermined or pre-set minimum value.

If the signal strength is not larger, i.e. not greater, than the second predetermined or pre-set threshold value, the wireless device 230 will in Action 602 perform or trigger a cell-reselection, e.g. a cell reselection procedure. In other words, if the signal strength is equal to or lesser than the second predetermined or pre-set threshold value, the wireless device 230 will in Action 602 perform or trigger a cell re-selection.

If the signal strength is larger, i.e. greater, than the second predetermined or pre-set threshold value, the wireless device 230 will in Action 603, determine if the relative change in signal strength since the last measurement is lower, i.e. lesser, than the first predetermined or pre-set threshold value.

If the relative change in signal strength since the last measurement is not lower, i.e. not lesser, than the first predetermined or pre-set threshold value, the wireless device 230 will in Action 602 perform or trigger a cell reselection, e.g. a cell reselection procedure. This may also be expressed as the wireless device 230 in Action 602 triggers an evaluation of whether cell reselection to a better cell is possible.

If the relative change in signal strength since the last measurement is lower than the first predetermined or pre-set threshold value, the wireless device 230 will in Action 604 continue to camp on the first cell 212.

Some embodiments will now be described using the GSM/EDGE mobile system as example of the wireless communications system 200. The principles outlined are however generic, and applicable to all wireless communications systems, e.g. cellular systems, supporting mobility based on cell selection and reselection. As previously mentioned, this should not be seen as limiting the scope of embodiments disclosed herein to only the aforementioned system. Embodiments disclosed herein is also applicable to other wireless communications systems.

In GSM/EDGE systems each cell, e.g. by means of the radio network node serving the cell, is transmitting a Broadcast Control Channel (BCCH) carrier, configured to carry synchronization, broadcast and control channels. Currently, when performing cell selection and reselection, the wireless device, e.g. the wireless device 230, is mandated to sample the signal strength from the BCCH carrier of the serving cell, e.g. the first cell 212, as well as of surrounding cells, e.g. the second cell 222, typically indicated by a so called BCCH Allocation list (BA list), cf. the 3rd Generation Partnership Project (3GPP) Technical Specification (TS) 45.008, Radio subsystem link control, sub-clause 6.3.

The BA List is a list of frequencies of neighboring cells. The information may be useful for the wireless device 230 for performing and reporting measurements, and eventually in cell reselection and handover. The BA List is formed from information in the System Information (SI).

Based on an evaluation of a Path loss criterion C1 and a Cell reselection criterion C2, the wireless device evaluates the suitability of the serving cell and the surrounding cells, cf. 3GPP TS45.008, Radio subsystem link control, sub clause 6.4. If a more suitable cell than the current serving cell is found, the wireless device performs a cell reselection to the more suitable cell.

A trend is to extend the battery life of wireless devices. The document 3GPP TR 43.869, GERAN Study on Power Saving for Machine Type Communication (MTC) devices is e.g. suggesting to relax the requirements on determining the suitability of the serving cell and reselection. A wireless device is proposed to be allowed to camp on a serving cell as long as a path loss criterion such as C1 is fulfilled. It is first when the path loss criterion fails that the wireless device shall start monitor surrounding cells. This corresponds to the case schematically illustrated in FIG. 1. The reduction in neighbor cell measurements may be translated to a power saving for the wireless device.

However, such an approach may lead to unnecessarily poor performance of the wireless device as well as lead to increased interference levels in the wireless communications system due to the possibility of the wireless device hanging onto its serving cell too long, e.g., while one or more better neighbor cells are available.

To overcome this drawback, some embodiments herein introduce a Change in a path loss criterion C3 that is based on two consecutive readings of the path loss criterion C1 at two time instances $T_n$ and $T_{n+1}$ such that $C3=C1(T_n)-C1(T_{n+1})$. Thus, a wireless device 230 camping on the serving cell, e.g. the first cell 212, may measure the path loss at two points in time $T_n$, $T_{n+1}$ and determine the change in the path loss criterion C3. If the Change in the path loss criterion C3 exceeds the first predetermined or preset threshold value, e.g. a configurable limit $C3_{DELTA}$, then the change in path loss is sufficiently large for the wireless device 230 to start monitoring neighboring cells, e.g. the second cell 222, and perform cell reselection per the Cell reselection criterion C2. In other words, when the change in path loss criterion C3 of the serving cell, e.g. the first cell 212, exceeds the $C3_{DELTA}$ threshold value, the Cell reselection criterion C2 is evaluated for both the serving cell, e.g. the first cell 212, and neighbor cells, e.g. the second cell 222, to determine if any of the neighbor cells are better than the serving cell.

The threshold value $C3_{DELTA}$ may either be a single static value, e.g., a predetermined or preset value, or a semi-static value, e.g. a variable value, signaled by the serving cell e.g. in a system information message. The threshold value $C3_{DELTA}$ may also be a range of static or semi-static values where the actual value is selected dependent on the C1 criterion as evaluated at time $T_n$.

The time period T between two consecutive readings of C1, e.g., $T=T_n-T_{n+1}$, may also be either a single static value, e.g., a predetermined or preset value, or a semi-static value, e.g. a variable value, signaled by the serving cell e.g. in the system information messages. The time period T may also be a range of static or semi-static values where the actual active value is selected dependent on an estimated velocity of the wireless communications device at the time point $T_n$.

Figure 7:
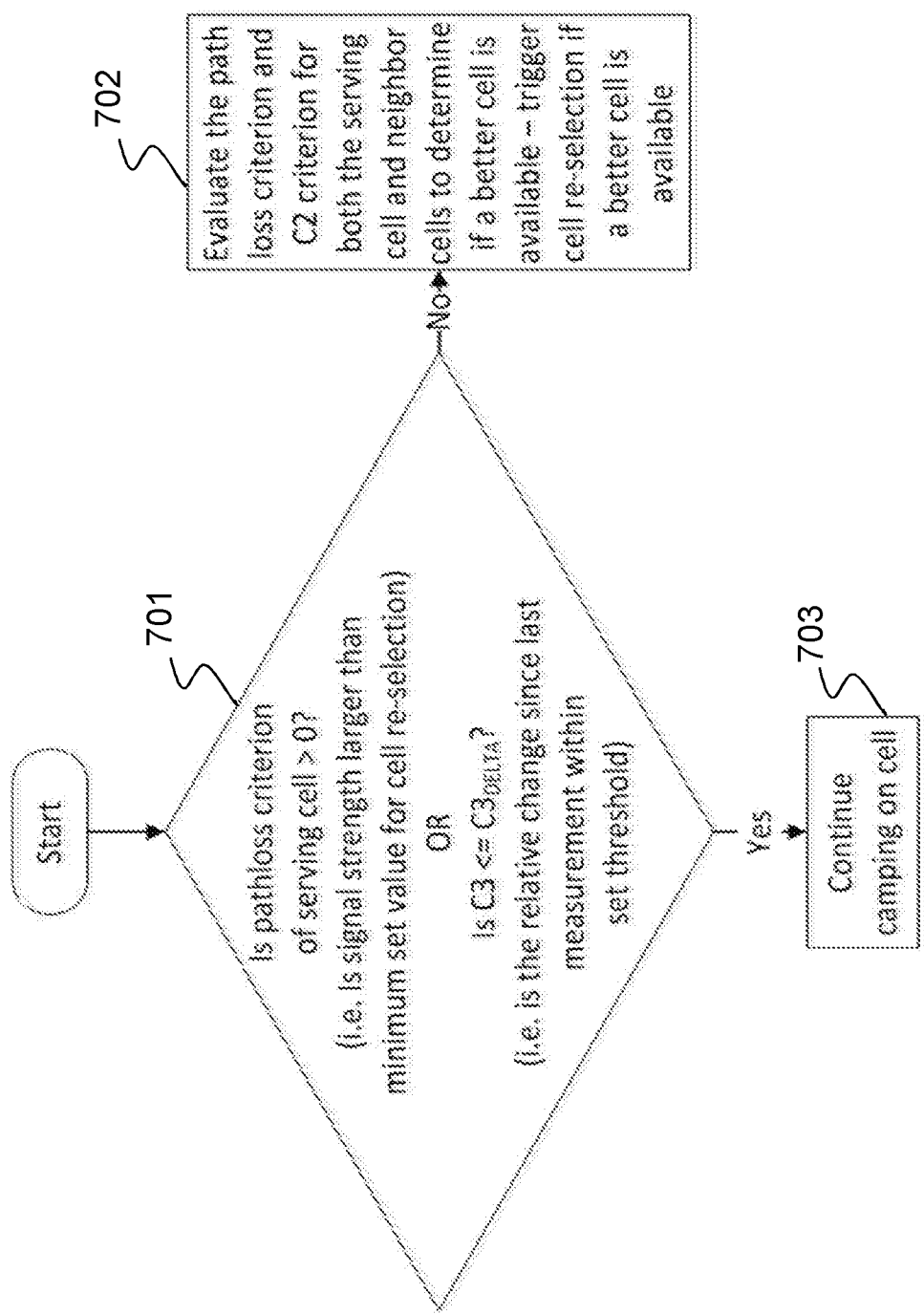
FIG. 7 is a flowchart depicting embodiments of a method performed by a wireless device.

FIG. 7 is a flowchart depicting embodiments of a method performed by a wireless device 230.

In Action 701, the wireless device 230 determines if the path loss criterion C1 of the serving cell, e.g. the first cell 212, is larger than 0. This means that the first signal parameter, e.g. the signal strength of a signal received at the wireless device 230 from the first RNN 210 serving the first cell 212 is larger than the second predetermined threshold value, e.g. a predetermined or preset minimum value, for cell reselection. The second predetermined threshold value may be a value indicating that the serving cell, e.g. the first cell 212, is still to be considered as suitable. Alternatively or additionally, the wireless device 230 may determine if the change in path loss C3 is larger than the first predetermined threshold value, e.g. the threshold value $C3_{DELTA}$. In other words, the wireless device 230 may determine if the relative change in path loss since the last measurement is within the set threshold value.

If the path loss criterion C1 of the serving cell, e.g. the first cell 212, is not larger than 0, or if the change in path loss C3 is larger than the threshold value $C3_{DELTA}$, the wireless device 230 will in Action 702 determine if it should perform cell reselection. Thus, in Action 702, the wireless device 230 may evaluate the change in path loss and the cell reselection criterion for both the serving cell, e.g. the first cell 212, and neighboring cells, e.g. the second cell 222, to determine if a better cell, e.g. a cell with a higher signal strength or a lower path loss than the serving cell, is available. If so, the wireless device 230 will perform cell reselection to the better cell.

If the path loss criterion of the serving cell, e.g. the first cell 212, is larger than 0, or if the change in path loss C3 is lower than the threshold value $C3_{DELTA}$, the wireless device 230 will in Action 703 continue to camp on the serving cell, e.g. the first cell 212.

When the word "comprise" or "comprising" is used in this disclosure it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method for triggering a cell reselection procedure during idle mode operation of a wireless device served by a first Radio Network Node (RNN) in a wireless communications system, the method comprising:
   during idle mode operation of the wireless device, determining if a second signal parameter of a second signal, received from the RNN, is larger than a second predetermined threshold for the cell reselection procedure;
   in response to determining that the second signal parameter is not larger than the second predetermined threshold, triggering the cell reselection procedure during idle mode operation of the wireless device; and
   in response to determining that the second signal parameter is larger than the second predetermined threshold, performing the following operations:
      determining a difference between the second signal parameter and a first signal parameter of a first signal received from the first RNN;
      determining if the difference is smaller than a first predetermined threshold for the cell reselection procedure;
      based on determining that the difference is not smaller than the first predetermined threshold, trigger the cell reselection procedure during idle mode operation of the wireless device; and
      based on determining that the difference is smaller than the first predetermined threshold, refraining from cell reselection and continue camping on a current cell.

2. The method of claim 1, wherein the first signal is received at a first point in time Tn and wherein the second signal is received at a second point in time Tn+1.

3. The method of claim 1, wherein the first and second signals are received using a Broadcast Control Channel (BCCH) carrier.

4. The method of claim 1, wherein the first and second signal parameters are first and second signal strengths, first and second path losses, or first and second quality based measures.

5. The method of claim 1, wherein the triggering of the cell reselection procedure further comprises:
   evaluating a cell reselection criterion, pertaining to at least signal strength, for the serving cell and one or more neighbour cells; and
   when a particular one of the neighbour cells is evaluated to provide better signal strength than the serving cell, performing the cell reselection to the particular neighbour cell.

6. A wireless device served by a first Radio Network Node (RNN) configured to operate in a wireless communications system, wherein the wireless device comprises:
   an interface comprising a receiver;
   at least one processor operatively coupled to the interface; and
   at least one memory storing computer-executable instructions that, when executed by the at least one processor, configure the wireless device to:
      during idle mode operation of the wireless device, determine if a second signal parameter of a second signal, received from the RNN, is larger than a second predetermined threshold for the cell reselection procedure;
      in response to determining that the second signal parameter is not larger than the second predetermined threshold, trigger the cell reselection procedure during idle mode operation of the wireless device; and
      in response to determining that the second signal parameter is larger than the second predetermined threshold, perform the following operations:
         determine a difference between the second signal parameter and a first signal parameter of a first signal received from the first RNN;
         determine if the difference is smaller than a first predetermined threshold for the cell reselection procedure;
         based on determining that the difference is not smaller than the first predetermined threshold, trigger the cell reselection procedure during idle mode operation of the wireless device; and
         based on determining that the difference is smaller than the first predetermined threshold, refraining from cell reselection and continue camping on a current cell.

7. The wireless device of claim 6, wherein execution of the instructions further configures the wireless device to receive the first signal at a first point in time Tn and the second signal at a second point in time Tn+1.

8. The wireless device of claim 6, wherein execution of the instructions further configures the wireless device to receive the first and second signals are received via a Broadcast Control Channel (BCCH) carrier.

9. The wireless device of claim 6, wherein the first and second signal parameters are, respectively, one of: first and second signal strengths; first and second path losses; and first and second quality based measures.

10. The wireless device of claim 6, wherein execution of the instructions configures the wireless device to trigger the cell reselection procedure during idle mode operation by:
    evaluating a cell reselection criterion, pertaining to at least signal strength, for the serving cell and one or more neighbour cells; and
    when a particular one of the neighbour cells is evaluated to provide better signal strength than the serving cell, performing the cell reselection to the particular neighbour cell.

11. A non-transitory, computer-readable medium storing computer-executable instructions that, when executed by at least one processor comprising a wireless device, configure the wireless device to perform the method according to claim 1.

* * * * *